United States Patent
Huang et al.

(10) Patent No.: US 11,404,863 B2
(45) Date of Patent: Aug. 2, 2022

(54) POWER SUPPLIES WITH LIMITED POWER PROTECTION AND RELEVANT CONTROL METHODS

(71) Applicant: Leadtrend Technology Corporation, Zhubei (TW)

(72) Inventors: Hsien-Te Huang, Zhubei (TW); Ming-Chang Tsou, Zhubei (TW); Chih-Nan Hsia, Zhubei (TW); Mao-Shih Li, Zhubei (TW); Pai-Feng Liu, Zhubei (TW); Chin-Ho Wu, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/223,562

(22) Filed: Apr. 6, 2021

(65) Prior Publication Data
US 2021/0313794 A1    Oct. 7, 2021

Related U.S. Application Data

(60) Provisional application No. 63/040,436, filed on Jun. 17, 2020, provisional application No. 63/006,679, filed on Apr. 7, 2020.

(51) Int. Cl.
*H02M 7/217* (2006.01)
*H02H 7/125* (2006.01)
*H02H 1/00* (2006.01)

(52) U.S. Cl.
CPC ........ *H02H 7/1252* (2013.01); *H02H 1/0007* (2013.01); *H02M 7/217* (2013.01)

(58) Field of Classification Search
CPC ......... H02M 3/33507; H02M 3/33515; H02M 3/33523; H02M 3/3353; H02M 3/33569; H02M 3/335; H02M 7/217; H02H 7/1252; H02H 7/085; H02H 1/0007; H02H 1/063
See application file for complete search history.

(56) References Cited

U.S. PATENT DOCUMENTS

| | | | |
|---|---|---|---|
| 10,944,330 B1 * | 3/2021 | Lee | H02M 3/33576 |
| 2021/0091675 A1 * | 3/2021 | Rajesh | H02M 3/33507 |
| 2021/0119526 A1 * | 4/2021 | Chung | H02M 3/33523 |

* cited by examiner

*Primary Examiner* — Nguyen Tran
(74) *Attorney, Agent, or Firm* — McClure, Qualey & Rodack, LLP

(57) ABSTRACT

A power supply is configured to limit its output power, converting an input voltage on a primary side into a bus voltage on a secondary side. A current-sense resistor detects a bus current output from the power supply to provide a current-sense signal. A bus switch is electrically connected to a secondary winding on the secondary side, configured to selectively supply power to the bus voltage. A power delivery controller controls the bus switch in response to the current-sense signal and a power detection signal on the secondary side. The power delivery controller provides a power threshold in response to the bus voltage, compares the power detection signal with the power threshold, and turns off the bus switch to stop supplying power to the bus voltage if the power detection signal exceeds the power threshold, thereby limiting the output power of the power supply.

14 Claims, 4 Drawing Sheets

POWER SUPPLIES WITH LIMITED POWER PROTECTION AND RELEVANT CONTROL METHODS

CROSS-REFERENCE TO RELATED APPLICATION

This application claims priority to and the benefit of U.S. provisional Application No. 63/006,679 filed on Apr. 7, 2020, U.S. provisional Application No. 63/040,436 filed on Jun. 17, 2020, and Taiwan Application Series Number 109131283 filed on Sep. 11, 2020, which are hereby incorporated by reference in their entirety.

BACKGROUND

The present disclosure relates generally to limited power control for a power supply, and more particularly to limited power control based on a power detection signal originating from a secondary side of a power supply with an isolation transformer.

An AC-DC power supply is a device that takes an alternating-current (AC) voltage from wall outlets and converts it to the direct-current (DC) power that most electronic devices used today. In addition to the output voltage regulation, an AC-DC power supply need to comply with various output ratings, such as stability of the output voltage and the maximum output current.

Since an AC-DC power supply might be plugged into a wall outlet at all times, government regulations also require the AC-DC power supplies to meet different safety requirements. For example, to prevent the fire caused by excessive power conversion, the limited power source (LPS) requirements are specified in the IEC 60950-1 standard and are used to define power supplies with the maximum performance capabilities. LPS-rated power supplies are unlikely to cause electrocution or fire due to the limitations on the output current and voltage they can deliver to a load.

The output current of a power supply can be detected by a current-sense resistor connected in series between a load and an output voltage, so a current-sense signal, the voltage drop across the current-sense resistor, can be a representative of the output current. In case the current-sense signal exceeds a certain threshold defined by the safety requirements, a power controller in a power supply could stop power conversion to prevent any fire incidents.

The current-sense resistor may become abnormal due to some unintended events. For example, a conductive particle might accidentally fall on a printed circuit board, and somehow an electrical short circuit happens between the two ends of the current-sense resistor, so the output current bypasses the current-sense resistor, making the current-sense signal no longer a representative of the output current. If the power supply solely relies on the current-sense signal to limit its output power, it may cause it to output power in excess of its defined capability, due to the failure of the current-sense resistor, and would not qualify as LPS.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

According to embodiments of the invention, a power supply has a primary side and a secondary side galvanically isolated from each other. The power supply can convert an input voltage on the primary side into a bus voltage on the secondary side, which is an output voltage. On the secondary side, a current-sense resistor detects a bus current that the bus voltage supplies to a load, and generates a current-sense signal. Based on the current-sense signal and a power detection signal on the secondary side, a power delivery controller limits the output power of the bus voltage or the magnitude of the bus current. The power detection signal is on the secondary side, in association with one of the devices comprising a SR controller located in the power supply, another current-sense resistor detecting the bus current, a photo coupler providing a feedback signal to the primary side, and a bus switch with a channel that the bus current goes through. According to embodiments of the invention, the SR controller has two power input nodes and a drive node, and the SR controller receives an operation voltage from the two power input nodes that the SR controller needs for operation. Via the drive node, the SR controller controls a SR switch. The power detection signal may be generated in response to a signal at one of the drive and two power input nodes.

Since the power detection signal is on the secondary side, its correlation with the bus current is more reliable, and the power detection signal could be used as a more accurate indicator for limited power control.

Figure 1:
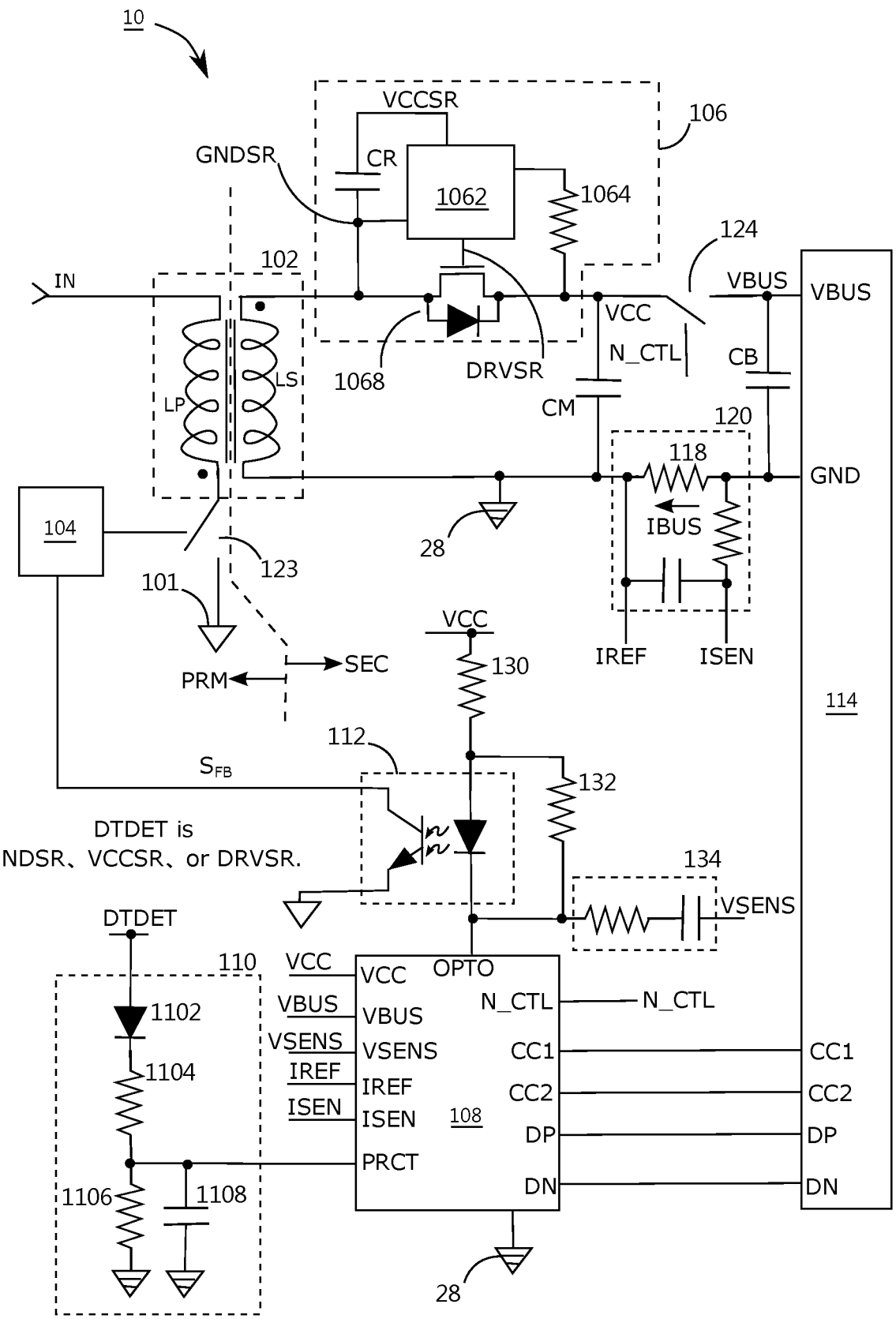
FIG. 1 demonstrates power supply 10 according to embodiments of the invention.

FIG. 1 demonstrates power supply 10 according to embodiments of the invention, converting input voltage IN on primary side PRM into bus voltage VBUS on secondary side SEC. Please note that all the voltages on primary side PRM are measured in reference to that at input ground 101 and those on secondary side SEC are in reference to that at bus ground GND. Bus voltage VBUS, whose voltage rating may be between 3.3V to 21V, could supply power to a load connected to the USB type-c connector 114. According to embodiments of the invention, input voltage IN could be a rectified voltage generated from a bridge rectifier connected to a wall outlet at home.

Power supply 10, including but not limited to transformer 102, power controller 104, synchronous rectifier 106, bus switch 124, intermediate decoupling capacitor CM, bus decoupling capacitor CB, current detection apparatus 120, current-limiting resistor 130, photo coupler 112, feedback resistor 132, duty-cycle detector 110, and power delivery controller 108.

Primary side PRM and secondary side SEC are galvanically isolated from each other. On primary side PRM, the current and the voltage of primary winding LP of transformer 102 is changed, by power controller 104 switching power switch 123 ON and OFF. Due to inductive coupling, secondary winding LS generates induced voltage and current, which being rectified by synchronous rectifier 106 to build up intermediate voltage VCC and intermediate ground 28. In FIG. 1, synchronous rectifier 106 is connected between intermediate voltage VCC and secondary winding LS, but this invention is not limited to. Some embodiments of this invention have synchronous rectifier 106 connected between intermediate ground 28 and one end of secondary winding LS, and intermediate voltage VCC directly connected to the other end of secondary winding LS.

Current detection apparatus 120 includes current-sense resistor 118 connected between bus ground GND and intermediate ground 28, detecting bus current IBUS coming from bus ground GND to generate current-sense signal ISEN.

Intermediate decoupling capacitor CM and bus decoupling capacitor CB are for stabilizing intermediate voltage VCC (in reference to the intermediate ground 28) and bus voltage VBUS (in reference to the bus ground GND) respectively. Intermediate voltage VCC and bus voltage VBUS could be deemed as two voltage power sources. Bus switch 124 could supply power from intermediate voltage VCC to bus voltage VBUS if it is turned ON to perform a short circuit, and stop supplying if it is turned OFF to perform an open circuit.

Photo coupler 112 and current-limiting resistor 130 are connected in series between intermediate voltage VCC and power delivery controller 108.

Power delivery controller 108 can learn through pins CC1, CC2, DP, and DN of USB type C connector 114 how much voltage bus VBUS or bus current IBUS should be provided to USB type C connector 114, and controls intermediate voltage VCC and bus switch 124 accordingly. For example, assumingly power delivery controller 108 knows that bus voltage VBUS should be maintained at 5V, and bus current IBUS limited under 2A, while the relevant voltage and current values will vary according to different power delivery protocols. Therefore, power delivery controller 108 detects intermediate voltage VCC and current-sense signal ISEN to control the current through photo coupler 112, which provides feedback signal $S_{FB}$ to power controller 104 on the primary side PRM accordingly. In response to the feedback signal $S_{FB}$, the power controller 104 maintains or alters the duty cycle of power switch 123, controls the electric power transmitted to secondary side SEC, and further controls the magnitudes of intermediate voltage VCC and bus current IBUS. For example, if intermediate voltage VCC is currently regulated at 5V, which meets the demand from USB type-c connector 114, power delivery controller 108 uses control signal N_CTL to turn ON bus switch 124, making intermediate voltage VCC supply the electric power to bus voltage VBUS and the load connected to USB type-c connector 114.

Synchronous rectifier 106 includes SR switch 1068, SR controller 1062, decoupling capacitor CR, and detection resistor 1064. To supply operating voltage to SR controller 1062, the two ends of decoupling capacitor CR are connected to two power input nodes of SR controller 1062 respectively. At the two ends of decoupling capacitor CR are voltage VCCSR and SR ground GNDSR, where voltage VCCSR is higher than SR ground GNDSR. SR controller 1062 detects a channel voltage of SR switch 1068 via detection resistor 1064, that is, the voltage difference between SR ground GNDSR and intermediate voltage VCC, capable of generating drive signal DRVSR to control SR switch 1068. SR controller 1062 is configured to implement synchronous rectification, meaning that SR switch 1068 is substantially turned ON when the channel voltage is positive, and turned OFF when the channel voltage is negative.

Duty-cycle detector 110 is electrically connected between synchronous rectifier 106 and power delivery controller 108. In response to the change of signal DTDET at an input of the synchronous rectifier 106, the duty-cycle detector 110 provides power detection signal PRCT, based on which power delivery controller 108 limits the output power of power supply 10. According to embodiments of the invention, signal DTDET could be SR ground GDNSR, voltage VCCSR or drive signal DRVSR. Simply speaking, signal DTDET could be any variation signal that changes significantly on secondary side SEC in response to the switching of power switch 123 on primary side PRM, and somehow carries the information of the duty cycle of SR switch 1068. For instance, drive signal DRVSR could be signal DTDET because it indirectly carries the information of the duty cycle of power switch 123. Accordingly, power detection signal PRCT, which duty-cycle detector 110 generates, is in association with the duty cycle of SR switch 1068, and could be used as an indicator for the power delivery controller 108 to determine whether the present output power is overly high.

Duty-cycle detector 110 shown in FIG. 1 performs the functions of rectification and low-pass filtering to generate power detection signal PRCT. Duty-cycle detector 110 includes diode 1102, resistors 1104 and 1106, and capacitor 1108. Diode 1102, as a rectifier, removes the negative portion of signal DTDET. Resistors 1104, 1106, and capacitor 1108 form a low-pass filter to stabilize power detection signal PRCT, whose DC level is in association with the duty cycle of SR switch 1068. As shown in FIG. 1, diode 1102 and low-pass filter are connected in series between an input of synchronous rectifier 106 and power delivery controller 108. If bus voltage VBUS is known, there must exist a correlation between the duty cycle of SR switch 1068 and bus current IBUS. Therefore, power detection signal PRCT, in association with the duty cycle of SR switch 1068, can be used as another indicator or representative of bus current IBUS.

Figure 2:
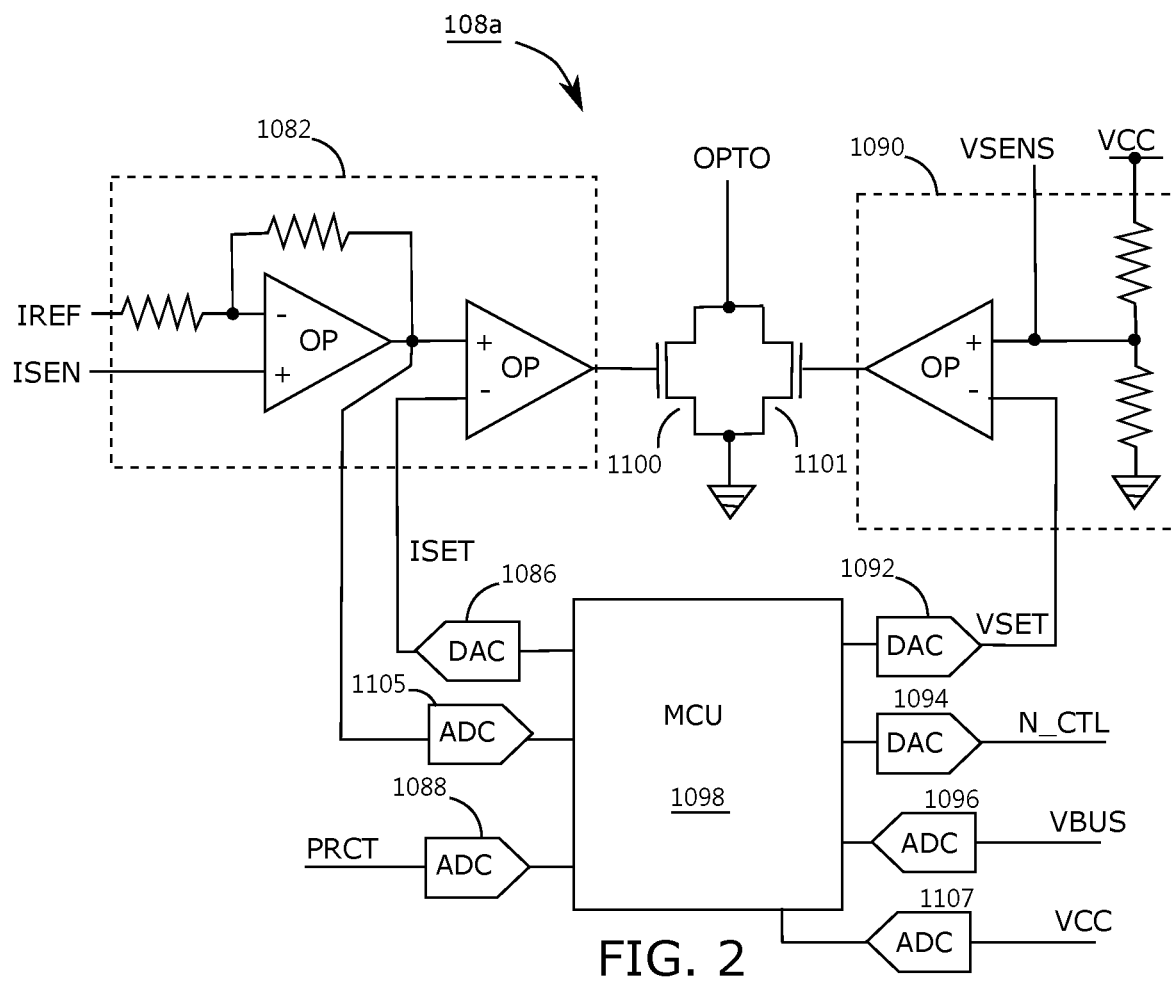
FIG. 2 demonstrates power delivery controller 108*a*.

FIG. 2 demonstrates an example of power delivery controller 108a, including current-feedback block 1082, voltage-feedback block 1090, NMOS transistors 1100 and 1101, digital-to-analog converters (DACs) 1086, 1092 and 1094, analog-to-digital converters (ADCs) 1088, 1096, 1105 and 1107, and micro-computing unit (MCU) 1098. Current-feedback block 1082 amplifies the difference between current-sense signal ISEN and reference signal IREF, which is about the same as intermediate ground 28, as shown in FIG. 1, and the result is then compared with current threshold ISET to control NMOS transistor 1100 driving photo coupler 112. This amplified result, after converted into a digital form, is also forwarded to MCU 1098. Current-feedback block 1082 and MCU 1098 are configured to make bus current IBUS not higher than a certain value corresponding to current threshold ISET, which can be determined according to bus voltage VBUS or the information received from pins CC1, CC2, DP and DN. Analogously, voltage-feedback block 1090 scales down intermediate voltage VCC to generate the detection signal VSENS, which is compared with voltage setting VSET provided by MCU 1098 through DAC 1092 to control NMOS transistor 1101.

Voltage-feedback block 1090 and MCU 1098 are configured to make bus voltage VBUS not higher than a certain value corresponding to voltage setting VSET, which can be determined according to the information received from pins CC1, CC2, DP and DN.

MCU 1098 monitors the present values of bus current IBUS, bus voltage VBUS and intermediate voltage VCC via ADCs 1105, 1096 and 1107 respectively. MCU 1098 also monitors power detection signal PRCT via ADC 1088.

Figure 3:
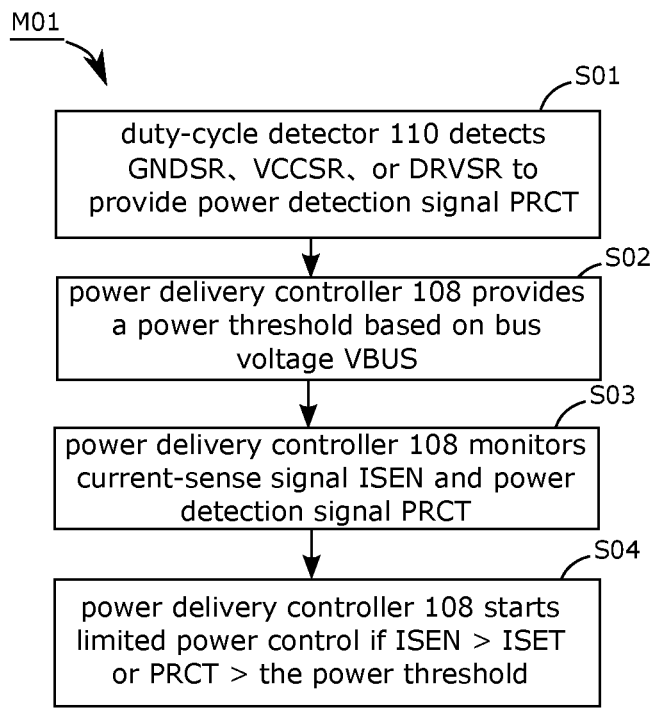
FIG. 3 shows control method M01 in use of power supply 10.

FIG. 3 shows control method M01 in use of power supply 10. In step S01, duty-cycle detector 110 detects one of voltage VCCSR, SR ground GNDSR and drive signal DVRSR to provide power detection signal PRCT. Step S02 follows step S01, where power delivery controller 108a provides a power threshold based on current bus voltage VBUS from ADC 1096, or the target value of bus voltage VBUS based on information received from pin CC1, CC2, DP, and DN. For example, power delivery controller 108a can embedded a lookup table in its firmware to define the corresponding relationship between bus voltage VBUS and the power threshold. In step S03, the power delivery controller 108a monitors both current-sense signal ISEN and power detection signal PRCT. In step S04, once bus current IBUS causes current-sense signal ISEN to exceed current threshold ISET, or causes power detection signal PRCT to exceed the power threshold provided in step S02, and this abnormal situation continues for a predetermined period of time, then power delivery controller 108 starts limited-power control, sending signal via DAC 1094 to forcibly turn OFF bus switch 124.

The lookup table defining correlation between bus voltage VBUS and the power threshold could be built based on experiment results. It can be measured how much power detection signal PRCT is when a load receives a certain value of bus voltage VBUS and at the same time consumes the maximum allowable power from power supply 10. This measured result is the power threshold when bus voltage VBUS is at the certain value, and this correlation between the power threshold and bus voltage VBUS may be recorded in an embedded lookup table that power delivery controller 108a can reference to retrieve the power threshold based on the present bus voltage VBUS.

During a normal operation, power detection signal PRCT and current-sense signal ISEN can act as two indicators for limited power control, which can prevent the risk when one of the two indicators fails. For example, if current-sense resistor 118 suddenly becomes short-circuited and current-sense signal ISEN is no longer a representative of bus current IBUS, power detection signal PRCT can still reflect the current output power of power supply 10.

Figure 4:
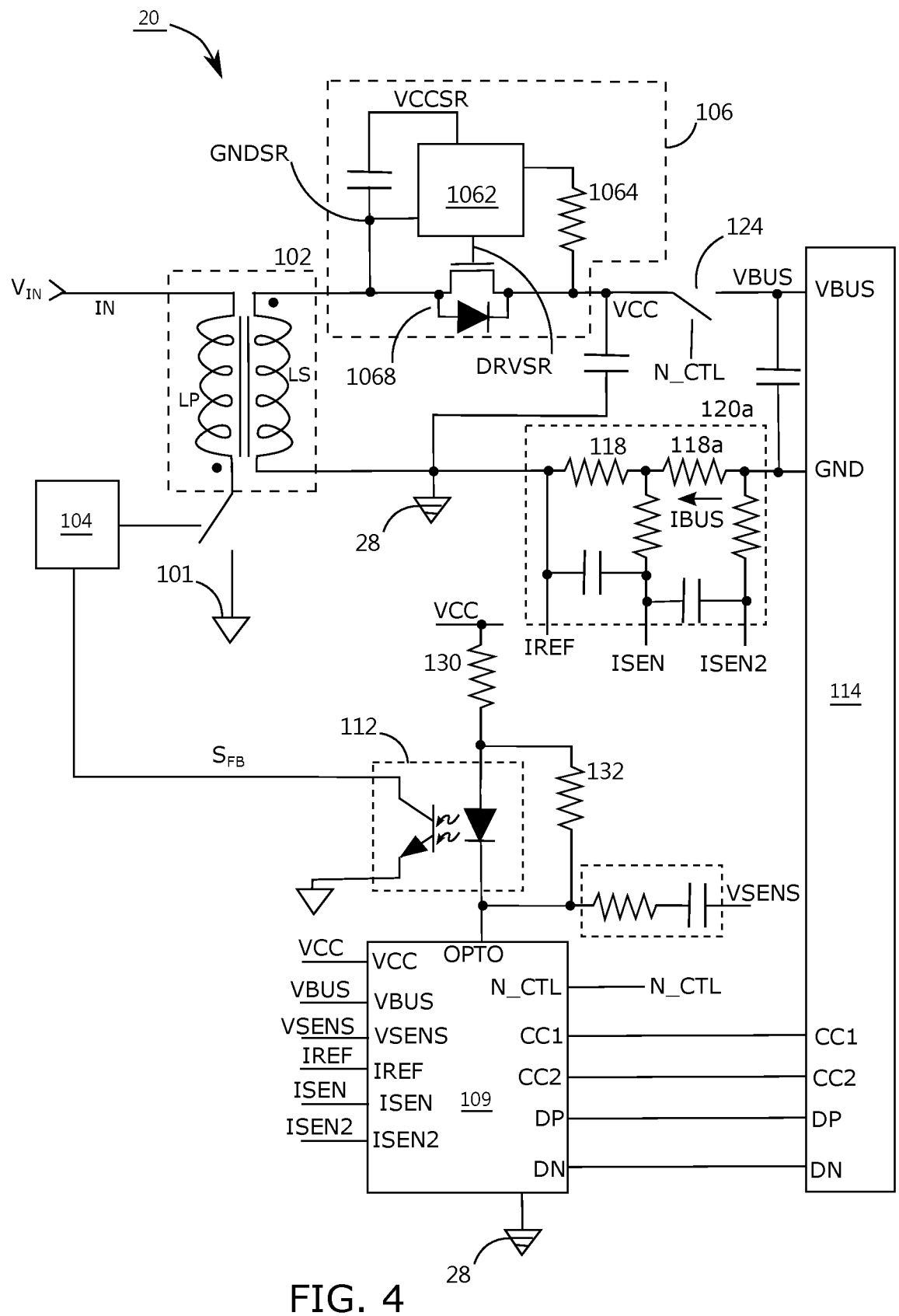
FIG. 4 demonstrates power supply 20 according to embodiments of the invention.

FIG. 4 demonstrates power supply 20 according to embodiments of the invention, which converts input voltage IN on primary side PRM into bus voltage VBUS on secondary side SEC. The same or similar aspects of power supply 20 in FIG. 4 and power supply 10 in FIG. 1 can be learned from the previous teaching and will not be repeated here.

Different from power supply 10 in FIG. 1, power supply 20 in FIG. 4 does not have duty-cycle detector 110, but has current detection apparatus 120a and power delivery controller 109. Current detection apparatus 120a has, but is not limited to, current-sense resistors 118 and 118a, both used to detect bus current IBUS from bus ground GND, and provide current-sense signals ISEN, ISEN2 and reference signal IREF to power delivery controller 109. Reference signal IREF, as shown in FIG. 4, is about the same as intermediate ground 28, and is also monitored by power delivery controller 109.

Figure 5:
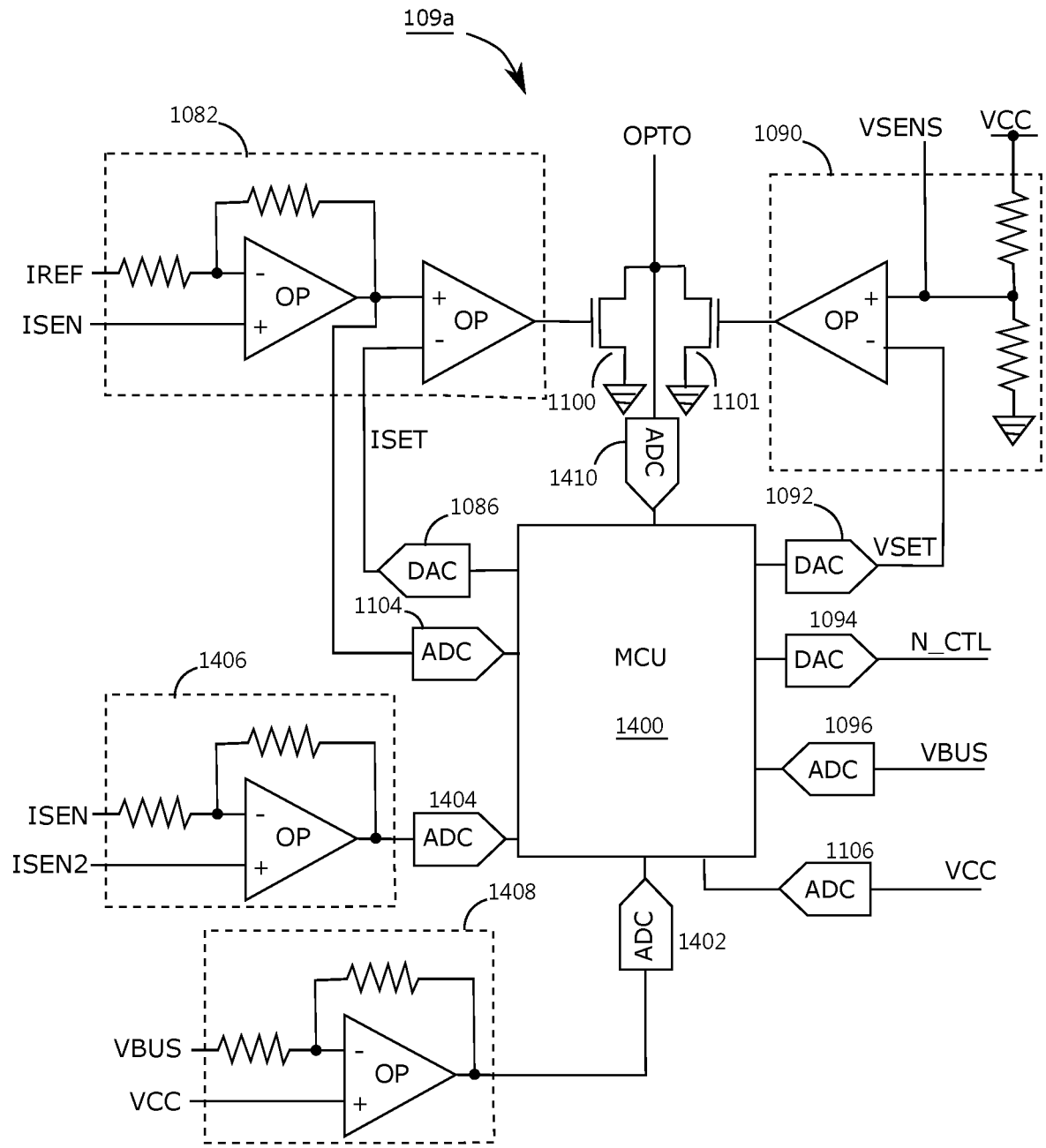
FIG. 5 demonstrates power delivery controller 109*a*.

FIG. 5 demonstrates power delivery controller 109a, applicable to power supply 20 in FIG. 4. The same or similar aspects of power delivery controller 109a in FIG. 5 and power delivery controller 108a in FIG. 2 can be learned from the previous teaching and will not be repeated here.

Different from power delivery controller 108a in FIG. 2, power delivery controller 109a in FIG. 5 has MCU 1400, ADCs 1402, 1404 and 1410, signal verification block 1406, and channel detection circuit 1408.

Signal verification block 1406 amplifies the difference between current-sense signal ISEN2 and current-sense signal ISEN, and sends the result to MCU 140 via ADC 1404. Current-sense signal ISEN2 can be used as a power detection signal for power delivery controller 109a to perform limited power control. According to an embodiment of the invention, current-sense resistors 118 and 118a have about the same resistance value. Therefore, the difference between current-sense signals ISEN2 and ISEN, theoretically, should be the same as that between current-sense signal ISEN and reference signal IREF. In FIG. 5, MCU 1400 is configured to trigger limited power protection and turns OFF bus switch 124 if the output of ADC 1104, which represents the difference between current-sense signal ISEN and reference signal IREF, differs too much from the output of ADC 1404, which represents the difference between current-sense signals ISEN2 and ISEN.

Channel detection circuit 1408 amplifies the difference between intermediate voltage VCC and bus voltage VBUS, and provides the amplified result in a digital form to MCU 1400 through ADC 1402. As shown in FIG. 4, intermediate voltage VCC and bus voltage VBUS are at the two ends of the channel of bus switch 124, and the difference between them is the channel voltage of bus switch 124. Based on bus voltage VBUS and a lookup table built in MCU 1400, MCU 1400 determines a power threshold, and when the output of ADC 1402 indicates the channel voltage of bus switch 124 exceeds the power threshold, MCU 1400 triggers the limited power protection and turns OFF bus switch 124.

MCU 1400 monitors drive voltage OPTO at a terminal of photo coupler 112 via ADC 1410. If drive voltage OPTO is less than a power threshold predetermined by MCU 1400, bus current IBUS is deemed over high and MCU 1400 triggers limited power protection to constantly turn OFF bus switch 124. This power threshold can be determined by the bus voltage VBUS and a lookup table.

In FIG. 4, any one of current-sense signal ISEN, current-sense signal ISEN2, the channel voltage of bus switch 124, and drive voltage OPTO could be used as an indicator signal to trigger the limited power protection. More particularly, in case that the current-sense resistor 118 abnormally becomes short-circuited and current-sense signal ISEN cannot continue representing bus current IBUS, another indicator, such as current-sense signal ISEN2, channel voltage of bus switch 124 or drive voltage OPTO, can still provide limited power protection.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply for converting an input voltage on a primary side into a bus voltage on a secondary side, comprising:

a transformer with a primary winding and a secondary winding, providing galvanic isolation to isolate the primary side from the secondary side;

a current-sense resistor for detecting a bus current output from the power supply to provide a current-sense signal;

a bus switch electrically connected to the secondary winding, configured to selectively supply power to the bus voltage;

a power delivery controller controlling the bus switch in response to the current-sense signal and a power detection signal on the secondary side, wherein the power delivery controller provides a power threshold in response to the bus voltage, compares the power detection signal with the power threshold, and turns off the bus switch to stop supplying power to the bus voltage if the power detection signal exceeds the power threshold, thereby limiting the output power of the power supply.

2. The power supply as claimed in claim 1, wherein the power delivery controller compares the current-sense signal with a current threshold, and turns off the bus switch to stop supplying power to the bus voltage if the current-sense signal exceeds the current threshold.

3. The power supply as claimed in claim 1, further comprising:

a synchronous rectifier, comprising:
 a SR switch, connected to the secondary winding;
 a SR controller generating a drive signal to the SR switch to control the SR switch and receiving operation power from two power input nodes; and
 a decoupling capacitor connected to the two power input nodes, at which are a relative-high voltage and a relatively-low voltage respectively; and a duty-cycle detector with an input for receiving one of signals consisting of the drive signal, the relatively-high voltage and the relatively-low voltage, providing the power detection signal to the power delivery controller.

4. The power supply as claimed in claim 3, wherein the duty-cycle detector performs low-pass filtering to generate the power detection signal.

5. The power supply as claimed in claim 3, wherein the duty-cycle detector includes a diode and a low-pass filter, connected in series between the input and the power delivery controller.

6. The power supply as claimed in claim 1, further comprising:

an intermediate voltage, wherein the bus switch selectively supplies power from the intermediate voltage to the bus voltage; and a photo coupler, electrically connected between the intermediate voltage and the power delivery controller, for providing a feedback signal on the primary side;

wherein the photo coupler provides a drive voltage to the power delivery controller as the power detection signal.

7. The power supply as claimed in claim 1, wherein the current-sense resistor is a first current-sense resistor, and the power supply comprises:

a current detection apparatus with the first current-sense resistor and a second current-sense resistor, both detecting the bus current to provide first and second current-sense signals respectively;

wherein the power delivery controller controls the bus switch in response to the first and second current-sense signals.

8. The power supply as claimed in claim 1, wherein the power delivery controller uses a channel voltage of the bus switch as the power detection signal.

9. A control method in use of a power supply converting an input voltage source on a primary side into a bus voltage on a secondary side, the control method comprising:

detecting a bus current output from the power supply to provide a current-sense signal;

providing a power threshold in response to the bus voltage;

providing a power detection signal on the secondary side, wherein the power detection signal is different from the current-sense signal; and comparing the power detection signal with the power threshold to stop supplying power to the bus voltage if the power detection signal exceeds the power threshold, thereby limiting the output power of the power supply.

10. The control method as claimed in claim 9, wherein the power supply includes a transformer and a synchronous rectifier, the transformer includes a primary winding and a secondary winding, and the synchronous rectifier is connected to the secondary winding, and the control method comprises:

generating the power detection signal in response to a variation signal from the synchronous rectifier.

11. The control method as claimed in claim 10, wherein the synchronous rectifier comprises a SR controller, a SR switch and a decoupling capacitor, and the variation signal is selected from one of the signals consisting of a drive signal to the SR switch, and two voltage signals at two ends of the decoupling capacitor.

12. The control method as claimed in claim 9, wherein the current-sense signal is a first current-sense signal, and the control method comprises:

detecting the bus current output from the power supply to provide a second current-sense signal as the power detection signal.

13. The control method as claimed in claim 9, wherein the power supply comprise a bus switch configured to supply power from an intermediate voltage to the bus voltage, the control method comprises:

detecting a channel voltage of the bus switch as the power detection signal.

14. The control method as claimed in claim 9, wherein the power supply has a primary side and a secondary side galvanically isolated from each other, a photo coupler is configured to detect an intermediate voltage on the secondary side to generate a feedback signal on the primary side, and the control method comprises:

detecting a drive voltage provided to the photo coupler as the power detection signal.

* * * * *